United States Patent [19]

Rusterholz

[11] 3,871,711
[45] Mar. 18, 1975

[54] METHOD AND APPARATUS FOR PNEUMATICALLY CONVEYING DISCRETE AMOUNTS OF PARTICULATE MATERIAL

[76] Inventor: Otto Rusterholz, Via G.A. Borgese 14, Milan, Italy

[22] Filed: Mar. 21, 1973

[21] Appl. No.: 343,273

[30] Foreign Application Priority Data
Oct. 25, 1972  Italy .................................. 30880/72

[52] U.S. Cl. ...................... 302/26, 302/41, 302/26, 302/66
[51] Int. Cl. ............................................. B65g 53/58
[58] Field of Search .................................. 243/6–15; 302/66, 2 R, 21, 24–26, 29, 41

[56] References Cited
UNITED STATES PATENTS

| | | | |
|---|---|---|---|
| 1,280,780 | 10/1918 | Lob .................................. | 302/21 X |
| 1,753,987 | 4/1930 | Hohne .............................. | 243/6 X |
| 3,265,324 | 8/1966 | Mach et al. ...................... | 243/6 |
| 3,305,191 | 2/1967 | Buchwald ........................ | 243/6 X |
| 3,380,780 | 4/1968 | Allen et al. ...................... | 302/26 |
| 3,408,113 | 10/1968 | Bouladon ......................... | 243/6 X |
| 3,556,603 | 1/1971 | Liebenberg ...................... | 302/2 R |
| 3,604,758 | 9/1971 | Flair et al. ...................... | 302/26 X |

FOREIGN PATENTS OR APPLICATIONS

| | | | |
|---|---|---|---|
| 496,186 | 11/1938 | United Kingdom ............... | 243/6 |
| 701,876 | 1/1954 | United Kingdom ............... | 302/50 |

OTHER PUBLICATIONS
IBM Technical Disclosure Bulletin Vol. 13, No. 1, June 1970, by Forslund.

Primary Examiner—Evon C. Blunk
Assistant Examiner—W. Scott Carson
Attorney, Agent, or Firm—Frank J. Jordan

[57] ABSTRACT

A method for pneumatically conveying incoherent solid materials (e.g. cereals, cement and the like) is disclosed, in which impulsive gas jets (generally air jets), impressed at time intervals to discrete points of a conveying pipeline, cause the material to be advanced stepwise therealong. Valve means are provided for synchronizing the impulsive gas jets with the closing of the pipeline section concerned and with the opening of a gas vent upstream of each gas jet, as well as with the opening of the pipeline and the closing of the gas vent downstream of each gas jet. The gas jets and the valve means thus become operative alternatingly and there are instants of time in which the individual discrete heaps of the material are thrust forward, and others, conversely, in which they are stationary. The invention also provides a system for pneumatically conveying incoherent solid materials, which can be embodied as a plurality of modular units: this fact enables any system made according to this invention to be extended and enlarged as necessity demands, without rebuilding the entire system throughout. Another outstanding advance over the prior art is that pipe sections of a smaller diameter, and higher working pressures can be used, as compared with those heretofore commonly employed by the prior art.

12 Claims, 6 Drawing Figures

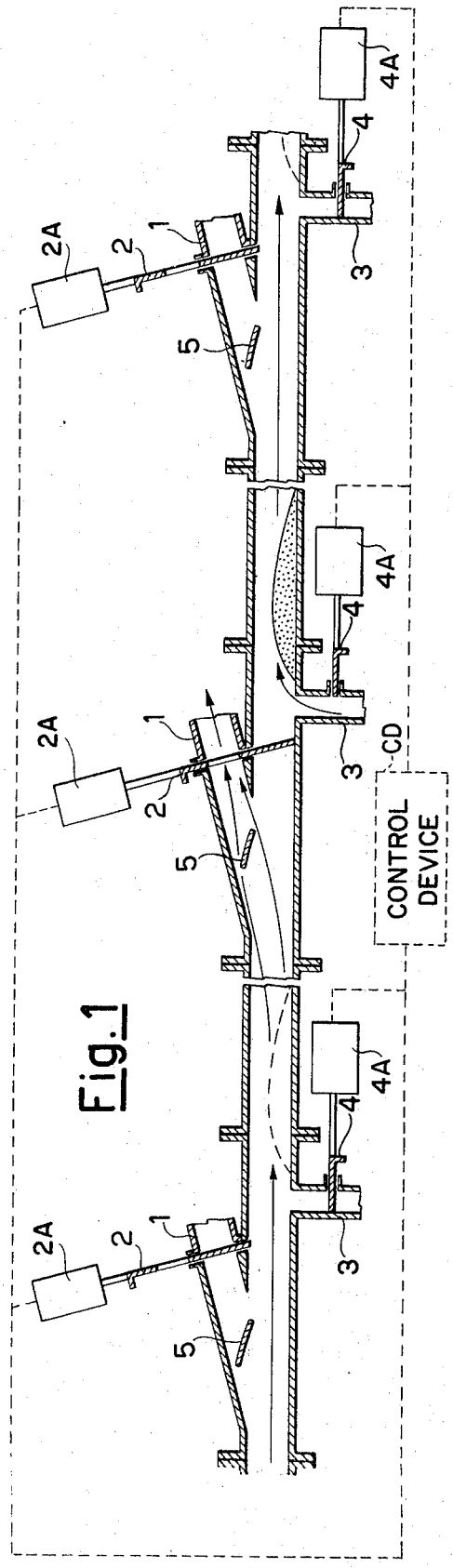
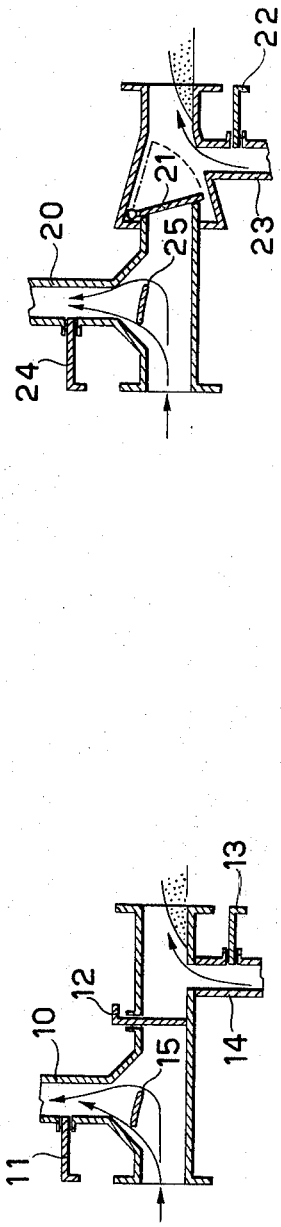

METHOD AND APPARATUS FOR PNEUMATICALLY CONVEYING DISCRETE AMOUNTS OF PARTICULATE MATERIAL

BACKGROUND OF THE INVENTION

This invention relates to a method and an apparatus for conveying a solid incoherent material, more particularly for pneumatic conveying systems.

PRIOR ART

A number of versions of pneumatic conveying systems for solid incoherent materials are known in the prior art, typical but by no means exclusive examples being the conveying systems for cereals, fertilizers, plastics materials in pellets and powder form, and so forth.

An almost universal feature of all of those installations and devices of the prior art is the fact that a stream of a pressurized fluid, generally air, is used, as a continuously flowing stream, for conveying the incoherent solid materials enumerated above: that is to say that a sort of mixture is formed between the carrier fluid and the material to be conveyed and such a mixture is thrust within conveying lines which start from hoppers, tanks or storage silos and are terminated by receiving hoppers or bins.

It should be observed at the outset, however, that the conventional installations are affected by several drawbacks, a few of which are positively serious and have been deemed irremediable heretofore.

In the first place, the conventional installations exhibit the serious limitation as to the distance at which conveying can be carried out: the whole technical literature of the art is concordant in stating that an individual system can perform the conveying over distances in the order of magnitude of 600 meters (2,000 feet) or slightly above. In order that conveying over longer spans may be effected, the system should be duplicated or, as an alternative, one should resort to intermediate storage bins, or to other expedients.

In addition, the conventional installations are affected by the inherent defect of a low mixture ratio between the conveyed material and the carrier fluid: as is known, this ratio is a weight ratio. Stated another way, the conventional installations require a heavy weight of air or another carrier fluid as compared with the amount of conveyed material.

Another serious drawback of the installations according to the prior art lies in the fact that, if, due to production requirements the conveying distance is to be increased, it is imperative to calculate the whole conveying pipeline once more, that is, to change the diameters of the pipes, the working pressures and many other design parameters. For example, a pipeline which has been calculated for a 50-meter span msut be wholly rebuilt if the new required distance is 150 meters, and so forth.

The conventional installations, moreover, are affected by heavy limitations as regards the working pressures, and high conveying capacities cannot be achieved unless at the expense of high first costs and consequent high capital lock-up.

To the above enumerated shortcomings of the prior art installations which, it should be recalled, are only the most conspicuous ones, the necessity is added of employing, as is usual, rotary members for the conveying-line charging-feeders, such as rotary locks and the like, that which involves a further rise in the first costs.

To sum up, the installations of the prior art are entirely devoid of adaptive versatility and cannot be enlarged, so that, by adopting them, the use of modular units, that is, prefabricated line sections adapted to be installed as an extension of an existing line whenever the commercial production requirement demand an enlargement of the installation, cannot even be conceived.

Last, but by no means the least, defect of the conventional installations, is the fact that, in them, the filling coefficient of the pipes is extremely low. This fact, in addition to the limitations as to the working pressure recalled above, is such as to compel to use high diameter pipes to get high capacities and, moreover, the pipelines are exploited, as to their percentage volumetric efficiency, to an extremely slight extent only.

In order to solve these problems, that is, to do away with all these drawbacks, a mere improvement of the existing installations is by far inadequate, but it becomes imperative to envisage a novel method for conveying incoherent solid materials by means of a fluid under pressure (also a negative pressure inasmuch as certain installations can work by suction), which is totally divorced, as to its theoretical basis, from that which has been suggested heretofore by the teachings of both the prior and the contemporary art.

OBJECTS OF THE INVENTION

The principal object of the present invention is thus to provide a method for the conveyance of incoherent solid materials by the pressure, either positive or negative, of a fluid, preferably a gaseous medium and more frequently air, which enables these materials to be forwarded over an unlimited distance, with a high mixture ratio between the conveyed material and the carrier fluid, and with a high filling coefficient of the conveying pipelines.

An additional object of the present invention is to provide a method for the conveyance of the materials referred to above, in which high conveying capacities can be attained and high working pressure can be used, while simultaneously reducing the diameters of the conveying pipes, It should be noticed that, in the prior art, the requirement of high capacities over long distances was always matched with the condition of an increase of the pipe diameters: this fact explains how the mode of operation of the prior art installations will never enable anyone to skip these requirements and that it is thus necessary radically to renew the conveyance technology for incoherent solid materials, if it is desired to do away with the serious defects which have been recalled hereinabove.

Yet another object of the present invention is to provide a system which is capable of being divided into a plurality of modular elements, so that the enlargement of existing installations, as imposed by requirements of production increase or other requirements of a technical and economical nature, necessitates only the addition of new modular units without requiring that the entire conveying plant be rebuilt anew.

SUMMARY OF THE INVENTION

Broadly stated, the present invention provides a method for the conveyance of an incoherent solid material along a pipeline, by the pressure, either positive or negative, of a gaseous body, characterized by comprising the steps of:

a. Feeding at least the initial section of said pipeline with a metered amount of said incoherent solid material, cutting off said pipeline downstream of said amount of material as it begins to be fed in, while simultaneously providing a venting path for said gaseous fluid immediately upstream of the cutoff point;

b. Cutting off said pipeline at the initial feeding point for said material, while simultaneously suppressing the cutoff downstream of said amount of material and shutting said vent for said gaseous fluid and providing a further cutoff at a second point farther downstream of said pipeline, while simultaneously providing a second venting path for said gaseous fluid immediately upstream of said second cutoff point;

c. Thrusting said metered amount of said incoherent solid material along said pipeline by an impulsive jet of said pressurized gaseous fluid;

d. Discharging through said second venting path the expanded gaseous fluid of said impulsive jet;

e. Suppressing the cutoff in said second point of the pipeline while simultaneously closing said second venting path, all of these steps being repeated in any desired number of points arranged at intervals along said pipeline.

Summing up, a metered amount of the material to be conveyed receives an air pulse (for example of the duration of a few seconds) as it is introduced into the pipeline, and is progressively thrust therealong at intervals, while a set of cutoff and venting valves for the gaseous fluid is alternatingly subjected to opening and closing movements. Stated otherwise, whenever, in the same set of valves the gas vent is open, the pipeline is cut off, and vice versa, whereas there is the reverse sequence of operations in the preceding set of valves and in the next following set, and so forth. In correspondence with each valve set, there is a feeding point for the gas under pressure.

If it is desired to visualize the performance of the method as defined above in summary, let it be assumed that the pipeline is made of a transparent material and that it is possible to see what occurs in its interior. One would see heaps of material which, at evey actuation of the valve set (to be described in greater detail hereinafter), are caused to advance within the tube every time that the impulsive gas jet (e.g. air) is fed in. Obviously, the actuation of the valve sets and the gas feed are timed by a timing control panel: the latter will not be described since it belongs to the general state of the art of the centralized controls.

The sequence of the process could also be diagrammatically exposed as follows:

Air vent 1 open . . . Valve 1 closed . . . Impulsive air jet . . . Air vent 2 closed — Valve 2 open . . . Air cutoff . . . Air vent $_{2n-1}$ open — Valve $_{2n-1}$ closed . . . Impulsive air jet . . . Air vent $_{2n}$ closed — Valve $_{2n}$ open . . . Air cutoff . . . Air vent $_{2n+1}$ open — Valve $_{2n+1}$ closed — Impulsive air jet . . . and so forth.

On account of such an alternate sequence of steps, the material is conveyed along the pipeline and is fed forward in an impulsive mode, the trend of the phenomenon being generally a sinusoidal one and can be compared to the translation of a pulse train along an electric line. Stated alternatively, there are time intervals during which the material is moved, others in which the material is stationary in the pipe: more detailedly the heaps of material are all stationary during a certain period of time, whereas they receive, all together, the individual impulsive air jets and all together are pushed on and travel along a certain pipe section whose length is a function of the nature of the material and the power of the impulsive jet, as well as of other design parameters which should not be considered in detail herein.

To carry out the method according to the present invention, there is provided a device for the conveyance of an incoherent solid material along a pipeline by the pressure of a gaseous fluid, characterized by comprising at least a point for the intermittent feed of said incoherent solid material, and a consecutive plurality of pipe sections, each of which is provided with a first valve member for controllably cutting off said pipeline, and with a second valve member adapted to allow the discharge of said expanded gaseous fluid from said pipeline, means being provided for closing said first valve member while simultaneously opening said second valve member, and a feeding point for said gaseous fluid under pressure, means being provided for impulsively feeding said gaseous fluid under pressure into said trunk when said first valve member upstream of said feeding point for the gaseous fluid is closed while is open the first valve member downstream of said feeding point for said gaseous fluid and said second valve means upstream of said feeding point for the pressurized gaseous fluid is open while is closed the second valve member downstream of said feeding point for the pressurized gaseous fluid, centralized control means being further provided for synchronizing the actuation of said first and second valve means with each impulsive feeding-in of said pressurized gaseous fluid as well as with the intermittent line-feeding with metered amounts of said incoherent solid material.

It will be noticed immediately that, with the obvious exclusion of the feeding point (container or bin) and the members for its control, the installation can be divided into an unlimited number of pipe sections, each of which is provided with said first and said second valve means as defined above, as well as with a feeding point for the pressurized carrier gaseous fluid.

A logical and extremely interesting consequence of such a feature is the fact that, for the first time in the history of the development of the pneumatic conveyor installations, it becomes possible to provide beforehand that number of "modular units" (a pipe section with its valves and the feeding point for the gaseous fluid) which is necessary for making up an installation having any desired length whatsoever.

Obviously, for convenience of construction, the first and the second valve means, that is, the gate-type valve for cutting off the pipeline section and the opening and locking gate for venting the gas which has been expanded after having worked in the pipeline, can be assembled into a single member, so that, when the pipeline is locked, the air vent is open, and vice versa, in correspondence with each feed-in point for compressed air. There is no reason why, instead of compressed air, any other gaseous fluid may be used, for example an inert gas, if this is imposed by quite special requirements.

Gate-type valves can be usefully employed and their control may be electromagnetic, pneumatic, hydraulic or of any other kind: that which counts is that there is the synchronizing of the steps of the method in question, and that there is the alternating sequence of opening—cutoff, cutoff—opening . . . and so on, for consecutive sets of valve members.

As regards the initial point of the installation, that is the one where the metered amounts of the incoherent solid material to be conveyed are fed in, it will generally comprise a container which is fed, by gravity, by the solid material which is caused intermittently to fall by the agency of a gate valve and the like. It is then necessary to provide a feed-in point for the compressed carrier fluid immediately upstream of the container, to impress the initial thrust to every metered amount of material. The impulsive jet of compressed gas will take place, consistently with that which has been disclosed above, as the gate which allows the solid material to fall is closed. This movement, as is obvious, is synchronized with the actuation of all the other valve means of the pipeline sections, as well as with the feeding in of the impulsive jets of the compressed gaseous fluid along the entire pipeline. To complete the summary description of the operation, it suffices to add that, once the gate of the container has been opened and then closed during that time interval (in the order of a few seconds) which is necessary for feeding in a metered amount of material into the conveying pipeline, there is an air jet which pushes said initial metered amount of material, while there are simultaneously acting, in an alternating sequence, the other impulsive jets along the line and are caused to operate, in the alternating sequence described above, all the valve means which are installed along the line, so that the consecutive amounts of material are fed forward along the line for a certain portion thereof, are stopped during a certain time interval, are fed forward again, and so on, each individual metered amount of material sequentially occupying the place of those which had gone past before it, until finally reaching a receiving bin or a dumping site which has been specially provided therefor.

DRAWINGS

The foregoing and other objects, features and advantages of the invention will become apparent from the ensuing detailed description of a preferred embodiment of the invention, shown by way of example only in the accompanying drawings, wherein:

FIG. 1 diagrammatically shows a few pipeline sections with their valve means and the feed-in points for the pressurized gaseous fluid.

FIGS. 1a and 1b give a few diagrammatical examples of the valve means.

DETAILED DESCRIPTION OF THE PREFERRED EMBODIMENTS

Figure 2:
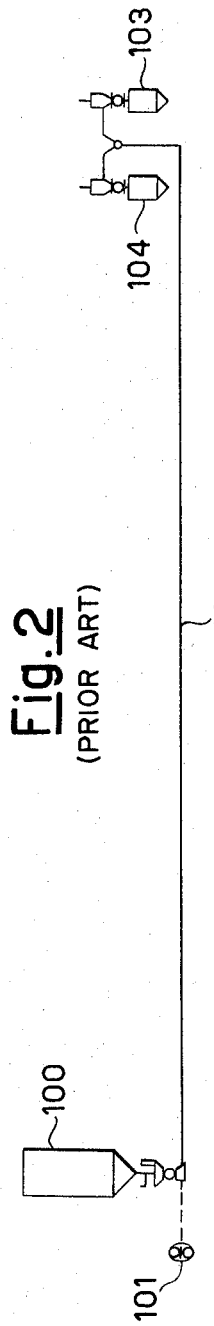
FIG. 2 shows a diagram of a pipeline trunk according to the prior art, given by way of comparison.

Reference being had, at the outset, to FIG. 1, there will be seen a conveying pipeline composed by consecutively arranged pipe sections, each of which is provided with an air vent 1, a gate 2 adapted to leave the pipeline open when the air vent 1 is closed, and vice versa, a compressed air inlet 3 equipped with a cutoff valve 4 and a conventional baffle 5 which is intended, as usual, to prevent dust from being scattered around when driven by the air jet. There will be provided, obviously, as it is conventional, suitable filters for collecting the dust: an additional advantage of the present invention lies in the extreme convenience of the automatic filter-cleaning in the instants of time which are deemed necessary, for example by the agency of a counterflow air jet.

By observing FIG. 1, the operation of the assembly is immediately understood: as a matter of fact, when the air vent 1 of the trunk is closed, the pipe is not cut off at that point, whereas the air feed inlet 3 is closed by the gate 4. In the subsequent pipeline trunk, the positions of the gates are reversed, since the air vent 1 is open (gate 2 down), the pipeline is cut off, and the compressed air inlet 3 of the second trunk is open. In the further, i.e. third trunk, the valve set occupies the same position as in the first trunk, and so on. The drawing also shows the heaps of material which is being progressively fed forward along the pipeline and the arrows show the compressed air path. As outlined above, after a certain preselected time interval, the positions are reversed since the first trunk will be locked, will receive air and will be vented, the second trunk will be open and will be prevented from venting while it will receive no air jet, the third trunk will be closed, will be allowed to vent and will receive an impulsive air jet and so forth. The gate 2 and cutoff valve 4 may each be power operated such as by a pneumatic or electromagnetic operated device as indicated at 2a and 4a respectively, the latter device in turn being controlled by a central control device indicated at CD in FIG. 1.

FIGS. 1a and 1b show two alternative embodiments of the valve means useful for carrying out the method according to the invention. In FIG. 1a, the air vent 10 can be cut off by a gate 11, the pipeline can be locked by the gate 12 and the compressed air inlet pipe 14 can be locked by a gate 13. For synchronizing the several gate opening and closing steps, reference is made to what has been detailedly disclosed in the foregoing. In FIG. 1b, the air vent 20 can be locked by the gate 24 while the valve 21 is of the swinging door type: it is opened if a positive pressure obtains upstream thereof and is closed in the opposite case. As can be seen in the drawing, the valve is pivotally mounted for swinging. The compressed air inlet 23 can be locked by a gate 22. In both the embodiments of the valve means, there are provided conventional baffles 15 (FIG. 1a) and 25 (FIG. 1b) whose function has already been explained hereinbefore.

Figure 2A:
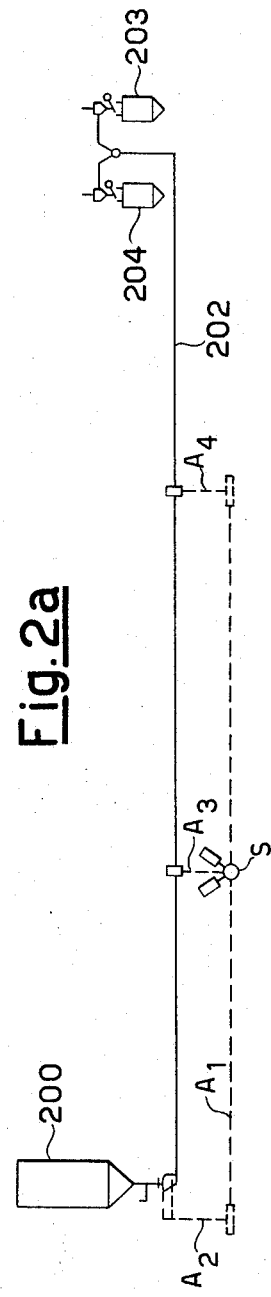
FIG. 2a shows a diagram of a pipeline section or modular unit according to the present invention.

Having now reference to FIG. 2 and FIG. 2a, a practical example of application of the method according to the invention and of use of the device which carries it into constructive practice will now be illustrated.

EXAMPLE

FIG. 2 shows a trunk of a conventional pipeline; there can be seen a feeder bin 100 and a compressor 101, a pipeline 102 and two receiving bins 103 and 104.

The product to be conveyed is wheat, with an impurity contents (sand). The apparent specific gravity of the material to be conveyed is 0.75 metric tons per cubic meter. The conveying capacity is 15 metric tons an hour. The length of the pipeline 102 is 150 meters, 10 meters of which in vertical and let it be assumed that the conveyance takes place exactly from the storage bin 100 to two receiving bins 103 and 104 for intermediate processing as shown in the drawing. The rate of operation of the installation is 8 hours a day.

As is conventional for installations of this kind, the line is fed by means of a rotary lock (a rotary-vane valve) and, on account of a considerable percentage of sand and taking into account the daily working hours of the installation, the working pressure of the valve should not exceed 0.3 effective atmospheres. The compressor 101 is of the Roots type with a peak working pressure of 0.3 effective atmospheres. The volume of drawn-in air is 50.5 cubic meters a minute. The absorbed power is 42 HP. The diameter of the conveying pipeline 102 is as high as 200 millimeters.

Observing now FIG. 2a, which shows the configuration that an installation according to this invention would take for effecting the same conveyance as described above, there will be seen: a feeder bin 200, a pipeline 202, a source of compressed air S (a compressor), a compressed air main $A_1$ with branching-offs $A_2$, $A_3$ and $A_4$, arranged in parallel. The pipeline 202, which is an embodiment of the modular unit recalled above, opens into two processing storage bins 203 and 204. As already outlined, the feeding system for the pipeline is of the free fall type in the vicinity of the initial point of the pipeline and there is an air jet (trunk $A_2$) for starting the conveyance flow. If a run of 150 meters is considered, as indicated above, three modular units, as long as 50 meters each, will suffice. The basic features of the invention, in the first place, enable the diameter of the pipeline 202 to be reduced to as few as 80 millimeters (instead of the two hundred millimeters referred to above for the conventional installation). The cycle frequence (feeding in of the solid material, that is, wheat in the case in point) is 10 seconds. The volume of each metered amount of material is thus $$15,000/360 \cdot 0.75 = 55.5 \text{ liters (volume of each heap of material)}$$

The filling coefficient for each modular unit is 22.2%: this is an extremely significant value since the filling coefficient of the pipeline, for a conventional continuous flow installation, seldom exceeds a few units per cent.

The volume of the air expanded through the vent for each trunk or modular unit, on considering a final speed of air in the tube (80 millimeters diameter) equal to 27 meters per second, with reference to an average venting-off time of 3 seconds, is:

$$27 \cdot 0.00501 \cdot 60 \cdot 3/10 = 2.43 \text{ cubic meters per minute}$$

Obviously, the volume of expanded air (in normal cubic meters) for the entire installation, which comprises, as outlined above, three modular units, is 3 times the amount as calculated just now, that is 7.29 cubic meters per minute. To such an amount there will be added 2 cubic meters per minute for a possible preliminary injection, thus reaching a total volume of 9.29 cubic meters a minute. Such a value should be compared altogether with more than 50 cubic meters per minute of air drawn by the conventional installation as illustrated above for comparison purpose.

As regards the comparison between the pressures which can be adopted, also in this case the comparison is clearly and unquestionably in favour of the installations made according to the present invention, inasmuch as, in the case in point, assuming that the power absorbed be the same in the two cases (the conventional installation of FIG. 2 and the installation according to the invention of FIG. 2a), the pressure which can be used in the installation according to the present invention is:

$$p = 0.3 \cdot 50.5/9.29 = 1.63 \text{ effective atmospheres.}$$

This shows that by adopting a method and an apparatus according to the present invention it is possible, in the case in point, to adopt a working pressure which is as high as five times that which one would have been compelled to adopt according to the conventional technology. Screw-, piston- and any other kind of compressors can be used.

The example which has been disclosed and illustrated above is more than sufficient to show not only the technical and economical advantages of the invention, but also the fact that the latter, for solving the problem of pneumatically coveying solid materials, threads a path which was wholly unknown to both the prior and the contemporary art.

Summing up, not only a solution is provided which had never been suggested heretofore for the problem of pneumatically conveying solid materials, but also the solution of side problems the prior art did not even care to pose.

In certain cases, a preinjection of air could be advisable, with a nozzle whose axis is generally an extension of the pipeline axis, to assist the introduction of the material into the conveying pipeline.

Figure 3:
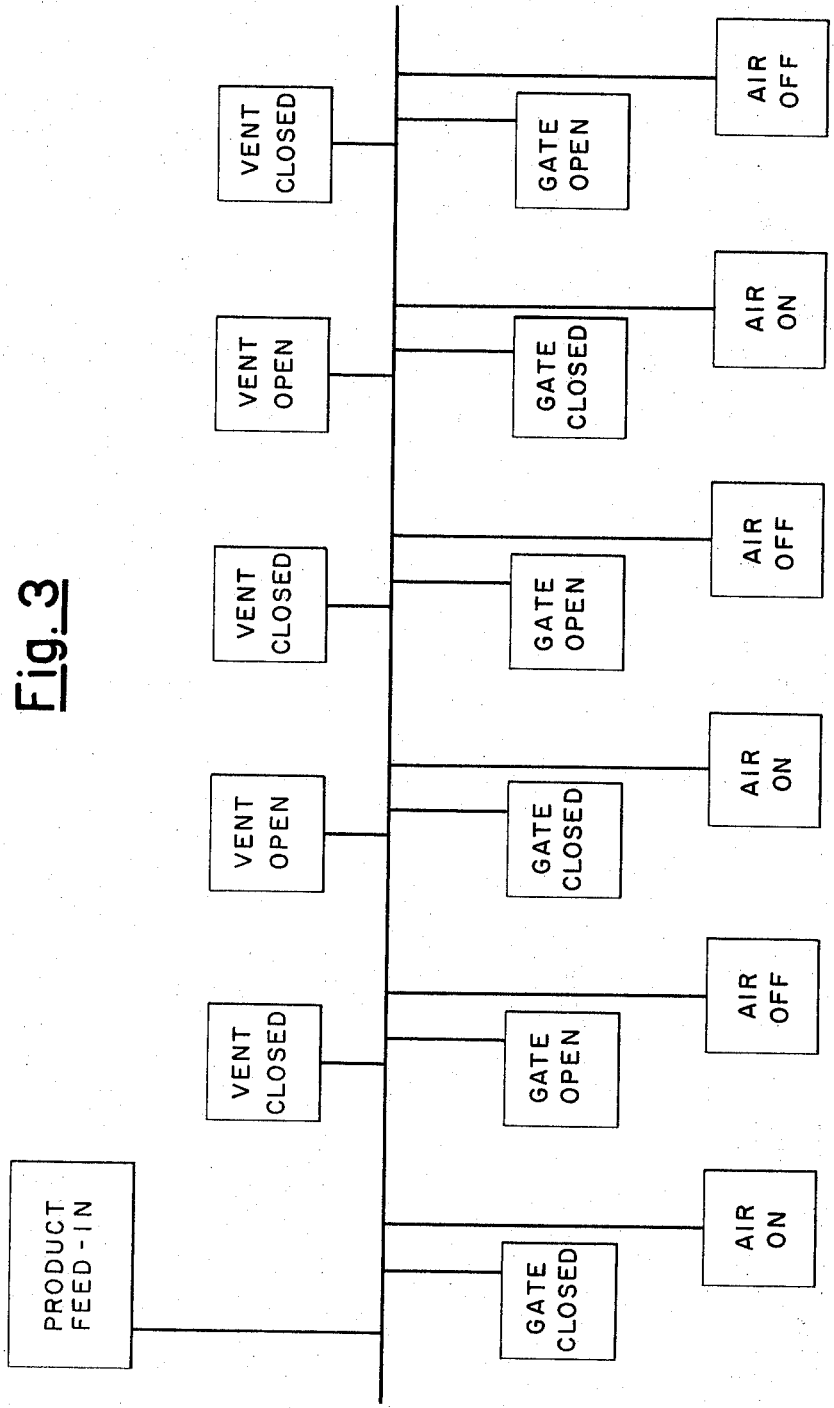
FIG. 3 is a block diagram which is illustrative of the orderly sequence of steps which make up the method according to the present invention.

Lastly, FIG. 3 is a general block diagram which illustrates the performance of the method according to the present invention, in a certain instant of the operative cycle. As already detailedly expounded above, in the subsequent instant of time, the functions of the several members are reversed. The diagram of FIG. 3 does not necessitate any particular comment since it can be understood at a glance.

While the invention has been described and illustrated with reference to a preferred embodiment thereof, it will be understood to all those skilled in the art, that different changes in form and details can be introduced therein without departing from the basic idea or the scope of this invention.

What I claim is:

1. A method of conveying an incoherent solid material along a pipeline utilizing a gaseous fluid, comprising the steps of:

forming said pipeline into a plurality of consecutive pipeline trunk sections;

feeding said pipeline at an initial feeding point with a metered amount of said incoherent solid material;

introducing a source of said gaseous fluid at a downstream portion of each said trunk sections while providing a through passage for said material through the respective trunk section;

venting said trunk sections by allowing the gaseous fluid to pass out from the respective truck section at a location downstream of the location where said gaseous fluid is introduced into the respective trunk section;

simultaneously with said venting, closing-off the respective trunk section at a location downstream of the location where the venting was effected and closingoff the introduction of said gaseous fluid into said respective trunk section, operating consecutive trunk sections alternately in opposite sequence whereby when one trunk section is operating as aforesaid in having said source of gaseous fluid introduced thereto, the next consecutive trunk section is operating as aforesaid to effect venting; and repeating said operation of said consecutive trunk sections in alternate sequence to thereby impulsively advance said incoherent solid material along said pipeline.

2. A method according to claim 1 including closing of said respective trunk section from venting when said gaseous fluid is introduced into said respective trunk section.

3. A method according to claim 1 wherein said metered amount of said incoherent solid material is thrust along said pipeline by an impulsive jet of said pressurized gaseous fluid.

4. A device for conveying an incoherent solid material along a pipeline utilizing a gaseous fluid, comprising means for intermittently feeding said incoherent solid material to said pipeline, means for feeding said gaseous fluid under pressure to said pipeline, said pipeline being made up of a consecutive plurality of pipeline trunks each including a portion of a pipeline, a first valve means in each of said pipeline trunks for controllably cutting off flow of said material through the respective pipeline trunk, a second valve means associated with each pipeline trunk adapted to allow the discharge of expanded gaseous fluid from the respective pipeline trunk, means for closing said first valve means while simultaneously opening said second valve means, a third valve means associated with each pipeline trunk for introducing a source of gaseous fluid to each of said pipeline trunks, said first valve means of each of said pipeline trunks being located downstream of the respective second valve means of the respective pipeline trunk, said third valve means of each of said pipeline trunks being located upstream of the second valve means of the respective pipeline trunk, each of said pipeline trunks being operable between a first operable position in which the first and third valve means are closed and the second valve means is open to effect venting and a second operable position in which the first and third valve means are open and the second valve means is closed, alternate pipeline trunks being operable alternately in opposite sequence between said first and second operable positions, whereby said material is impulsively advanced through said pipeline by said alternate operation.

5. A device according to claim 4 including a centralized control means for synchronizing the actuation of said first, second, and third valve means to provide impulsive feeding of said pressurized gaseous fluid as well as with intermittent feeding of metered amounts of said incoherent solid material.

6. A device according to claim 4 wherein said first valve means and said second valve means are united within a single valve body, said valve body having a movable two-positioned member adapted simultaneously to perform in its first position the venting of said expanded gaseous fluid and the cutoff of said pipeline and, in its second position, the closing off of said vent and the termination of the cutoff of said pipeline.

7. A device according to claim 6 wherein the movable member of said valve is a sliding gate.

8. A device according to claim 4 wherein said valve means are electromagnetically controlled.

9. A device according to claim 4 wherein said valve means are pneumatically controlled.

10. A device according to claim 4 wherein said feeding means for the pressurized gaseous fluid is provided immediately upstream of said feeding means for the incoherent solid material.

11. A device according to claim 10, wherein said feeding means for the incoherent solid material is a bin in which the material falls by gravity into the initial portion of the conveying pipeline.

12. A device according to claim 4 further comprising a pre-injection nozzle located in the vicinity of the starting point of the pipeline, immediately upstream of said starting point.

* * * * *